United States Patent Office 3,139,346
Patented June 30, 1964

3,139,346
MEAT FLAVORING AND COLORING COMPOSITION AND PREPARATION OF SAME
Jerome A. Meusel and Ralph A. Brunn, Baltimore, Md., assignors to The Baltimore Spice Company, Baltimore, Md., a corporation of Maryland
No Drawing. Filed July 20, 1961, Ser. No. 125,374
5 Claims. (Cl. 99—148)

This invention relates to liquid compositions developed to improve the color of meat and meat products and to the methods of preparing and using such compositions.

More particularly, the invention relates to liquid compositions which impart both color and flavor and a more lasting, fresh and moist appearance to meat products such as frankfurters or bolognas.

Spices are usually processed to extract the natural spice flavor or color from the spice by means of a simple solvent or a mixture of solvents. The resulting liquid is commonly designated as the "oleoresin" of this spice and depending on the solvents used, the technique employed in the extraction process and the quality of the raw material, the oleoresin may contain a greater or lesser proportion of the coloring matter normally and naturally present in the spice, a greater or lesser proportion of the essential oil content of the spice and a greater or lesser proportion of other constituents occurring in this spice, some of which may be insoluble or possess very limited solubility in the resulting oleoresin. One property which is used to indicate the quality of the oleoresin of paprika, for example, is a rating known as color units, a figure obtained by multiplying by 33,000 the absorbence of a 0.02% solution of the oleoresin through a 1 centimeter light path at 460 millimicrons on a model (B) Beckman spectrophotometer.

The addition of spices and seasonings to products made from meat is old and well known, for example as disclosed in J. W. Parry's "The Spice Handbook," published by the Chemical Publishing Co., Inc. (New York). Mixtures such as those described therein may be readily added to the meat products shortly after the mixture is prepared, particularly when a dry mixture is utilized, but in many instances it is found, particularly with liquid compositions, that the mixture does not produce the desired results when added to the meat some time after the mixture has been prepared.

In the commercial preparation of foods it is a common practice for the meat coloring and flavoring mixtures to be prepared by one supplier and shipped by him to a meat processor who may store the mixtures for a considerable interval before using them. During this period the stored mixtures may be subjected to varying temperatures and to movement from one place to another. As a consequence, particularly with liquid compositions, what was originally a uniform mixture of the meat treatment has often been found to have separated into layers, the composition of each layer representing a departure to some extent from the composition of the original formulation. Thus when the liquid mixture is pumped from a drum or other shipping or storage container, the material at the bottom of the drum may act in a noticeably different way from the material at the top of the drum. Re-mixing the stored mixture affords only a partial and temporary relief of the problem as it is impractical and undesirable because it increases the cost of the processing and equipment.

One object of this invention is to provide a liquid composition for the coloring of meat which exhibits a greater stability and a diminished tendency to separate than similar compositions heretofore known.

Another object of the invention is to provide a composition which gives sliced bolognas and other meat products an enduring attractive, moist, fresh appearance.

Still another object of the invention is to provide a liquid composition for the flavoring of meat which exhibits a greater stability and a diminished tendency to separate than similar compositions heretofore known.

Still another object of the invention is to provide a liquid composition for simultaneously flavoring and coloring meat which exhibits a greater stability and a diminished tendency to separate than similar compositions heretofore known.

For purposes of illustration the manner in which these and other objects are accomplished will be described in specific examples exemplifying the incorporation of a preferred meat coloring and meat flavoring agent, an oleoresin of paprika having a high color value in a sugar syrup, but it is to be understood that other spice oleoresins with high color values may be used, without departing from the intended scope of the invention.

In a preferred mode of preparing variations of the compositions exemplified below, the additional spice oleoresins and essential oils are preferably added to the high color oleoresin of paprika and the resulting mixture is then incorporated into the sugar syrup. It has been found that the incorporation may be effected by means of a simple mixer such as a portable propeller mixer, whereby a combination of emulsification, solution and dispersion appears to occur.

When using a normal oleoresin of paprika, e.g. an oleoresin with a color value of about 45,000 units, the freshly-prepared oleoresin-sugar syrup mixture could be added to meat at a rate of from ½ to 2%, to impart a desirable red color and flavor. However, it was found that when stored the mixture of normal color value oleoresin and sugar syrup began to separate after a week to 10 days, with the formation of a highly colored layer of oil floating on top of the mixture. The present invention is directed to overcoming this tendency to separate and resides in the discovery of products with enhanced stability and in the process whereby such products are prepared.

COMPOSITION

Briefly the constituents comprising the compositions of the present invention may be identified as (a) edible carrier, (b) spice oleoresin, and (c) spice oil, and, in some instances additional coloring agent.

(a) Edible Carrier

The preferred edible carrier utilized in the present invention consists of invert cane sugar syrup (60% inverted and 76° Brix). During the summer or when the mixture is to be stored in locations where it is likely to be exposed to temperatures in excess of 75° F. it has been found that the addition of some corn syrup to the invert sugar syrup diminishes the tendency for the spice constituents in the mixture to separate.

A particularly preferred edible carrier consists of about 70% by weight of a 50 to 60% inverted cane sugar syrup with a solids content of approximately 72° Brix and 30% by weight of corn syrup with a dextrose equivalent of approximately 42. Instead of the preferred mixture, cane sugar syrup alone, corn syrup alone, invert cane sugar syrup, or other mixtures of these can also be used as the carrier for the spice oil and spice oleoresin.

(b) Oleoresin

As discussed above, spice "oleoresins" are variable in composition. When using oleoresin of paprika in meat coloring compositions, the tendency of the composition to separate into non-uniform phases was found to be substantially diminished by the use of oleoresins of paprika having a rating of at least 80,000 color units and preferably as high as 180,000 color units or higher, as determined by multiplying by 33,000 the absorbence of a 0.02% solution of the oleoresin on a model (B) Beckman spectrophotometer through a 1.00 centimeter light path at 460 millimicrons. Other high color value spice oleoresins which may be used with, or instead of, the preferred high color oleoresin of paprika include oleoresin of turmeric and other colored oleoresins.

(c) Flavoring

Depending on the flavor desired and the meat product being prepared, essential oils, oleoresins of various spices or other flavoring material may be added to the mixture of sugar syrup and high color spice oleoresin, as for example essential oils, oleoresins, or other types of extractives of allspice, bay leaves, black pepper, sweet basil, caraway, cardamon, cassia, cinnamon, cloves, coriander, cumin, dill, fennel, garlic, ginger, laurel, marjoram, mustard, nutmeg, onion, sage, and thyme, or mixtures of two or more of these may be added depending on the meat product being treated and the flavor and color to be imparted to the meat.

(d) Additional Color (Optional)

Additional coloring agents may be added to the above mixtures when desired. For example, in mixtures intended for the processing of ham, caramel, a brown color made by caramelizing sugar has been found to be a useful addition to compositions of the type described.

METHOD OF MIXING

Finally, it has been found that increased stability is obtained and separation or layering of the mixture is deferred for much longer intervals by running the composition through a colloid mill after it has been mixed mechanically by means of a propeller.

The following compositions were prepared by charging an invert syrup or a mixture of invert sugar syrup and corn syrup into a tank and adding the mixture of oils and high color oleoresin thereto and then mixing the contents at room temperature by means of a mechanical agitator. Thereafter the mixture is run through a water cooled colloid mill, the cooling being sufficient to maintain the outlet temperature below 105° F. and preferably below 95° F.

Four formulations which are intended to be exemplary of the preferred embodiment of this invention are as follows:

| | A | B | C | D |
|---|---|---|---|---|
| Invert cane sugar syrup (pounds) | 100 | 100 | 100 | 100 |
| Oleoresin of paprika (ounces) | 4½ | 5¼ | 6¼ | 5 |
| Oil of coriander (ounces) | 1 | 1 | 1 | 1 |
| Oil of cardamom (ounces) | ¼ | ¼ | ¼ | ¼ |

In formula A the oleoresin used had a color value of 140,000 units, that used in B had a color value of 120,000 units, that used in C had a color value of 100,000, and that used in D had a color value below 80,000.

When prepared in the manner described, each of the mixtures A, B, and C obtained exhibited no noticeable separation after storage at temperatures ranging from 60° F. to 90° F. even after 30 days, whereas mixture D evidenced noticeable separation after being stored for 10 days under the same conditions.

Having now described the invention in accordance with the patent statutes we claim:

1. In a method of producing a liquid mixture for flavoring and coloring meat products which method comprises mechanically mixing a colored spice oleoresin and an edible liquid; the improvement which consists in utilizing as the spice oleoresin in said method, a spice oleoresin having a color value of at least 80,000 units whereby the resulting mixture has a diminished tendency to separate into a plurality of phases upon standing for extended intervals of time as compared with the tendency of an otherwise identical mixture to separate into a plurality of phases upon standing for extended intervals of time when a spice oleoresin with a color value of less than 80,000 units is used in the otherwise identical mixture in place of the spice oleoresin having a color value of at least 80,000 units and as the edible liquid in said method, a syrup selected from the group consisting of cane sugar syrup, inverted cane sugar syrup, corn syrup, and mixtures thereof.

2. The method of claim 1 wherein the mixture produced by mechanical mixing is passed through a colloid mill to enhance the tendency for the mixture to retain its uniformity throughout the mixture.

3. The method of claim 1 wherein the spice oleoresin is an oleoresin of paprika having a color rating of at least 80,000 color units.

4. The method of claim 3 wherein the relative proportions of spice oleoresin in the mixture are between 0.1 and 20 ounces per 100 pounds of edible liquid.

5. A liquid composition for flavoring meat comprising: an edible carrier having uniformly distributed therein an oleoresin of paprika, there being between about 0.1 and 20 ounces of said oleoresin of paprika per 100 pounds of edible carrier, wherein the oleoresin has a color rating of at least 80,000 color units and wherein the edible carrier is selected from the group consisting of cane sugar syrup, inverted cane sugar syrup, corn syrup, and mixtures thereof.

References Cited in the file of this patent

UNITED STATES PATENTS

| 2,134,380 | Stange | Oct. 25, 1938 |
| 2,925,365 | Nicholson et al. | Feb. 16, 1960 |
| 3,032,420 | Ferrari | May 1, 1962 |

OTHER REFERENCES

Moster et al.: "Color of Capsicum Spices, IV, Oleoresins Paprika," April 1957, pp. 226–229.
Food Technology, vol. 11, No. 4.
Perry: "Chemical Engineers Handbook," 1950, page 1169, McGraw-Hill, New York.